US012555770B2

(12) United States Patent
Tan et al.

(10) Patent No.: US 12,555,770 B2
(45) Date of Patent: Feb. 17, 2026

(54) SOLID ELECTROLYTE FILM FOR SULFIDE-BASED ALL-SOLID-STATE BATTERY BATTERIES

(71) Applicants: LG ENERGY SOLUTION, LTD., Seoul (KR); THE REGENTS OF THE UNIVERSITY OF CALIFORNIA, Oakland, CA (US)

(72) Inventors: Darren H.S. Tan, San Diego, CA (US); Zheng Chen, San Diego, CA (US); Ying Shirley Meng, San Diego, CA (US); Chi Ho Jo, Daejeon (KR); Wang Mo Jung, Daejeon (KR)

(73) Assignees: LG ENERGY SOLUTION, LTD., Seoul (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 59 days.

(21) Appl. No.: 18/340,403

(22) Filed: Jun. 23, 2023

(65) Prior Publication Data
US 2023/0335708 A1    Oct. 19, 2023

Related U.S. Application Data

(63) Continuation of application No. 16/409,275, filed on May 10, 2019, now abandoned.

(51) Int. Cl.
*H01M 4/136* (2010.01)
*H01M 4/62* (2006.01)
*H01M 10/39* (2006.01)
(52) U.S. Cl.
CPC .......... *H01M 4/136* (2013.01); *H01M 4/622* (2013.01); *H01M 10/3954* (2013.01)

(58) Field of Classification Search
CPC ......... H01M 23/0091; H01M 10/0561; H01M 4/622; H01M 4/136; H01M 2300/0068; H01N 6/166
See application file for complete search history.

(56) References Cited

U.S. PATENT DOCUMENTS 6,933,068 B2    8/2005    Asano et al.
2013/0309580 A1*  11/2013  Tomura ................ H01M 4/624
                                              429/304

(Continued)

FOREIGN PATENT DOCUMENTS

JP    2009-289534 A    12/2009
JP    2010-186682 A    8/2010

(Continued)

OTHER PUBLICATIONS

Espacenet machine translation of foreign patent JP2010262764A provided by applicant (Year: 2010).

(Continued)

*Primary Examiner* — Barbara L Gilliam
*Assistant Examiner* — Jordan E Berresford
(74) *Attorney, Agent, or Firm* — Birch, Stewart, Kolasch & Birch, LLP (57) ABSTRACT

A solid electrolyte film for sulfide-based all-solid-state batteries, and more particularly a composition of a solid electrolyte, a binder, and a solvent used to manufacture a solid electrolyte film for sulfide-based all-solid-state batteries that is thin and has high ion conductivity. In particular, a solid electrolyte film composition for sulfide-based all-solid-state batteries including a solvent having a dielectric constant of x ($1.5<x<3.0$). The thickness of a solid electrolyte film for sulfide-based all-solid-state batteries manufactured using the solid electrolyte film composition is 60 μm or less, and the solid electrolyte film is capable of being stably used for at (Continued)

least 1000 hours or more, and up to 2000 hours, based on the evaluation of Li plating and stripping.

13 Claims, 6 Drawing Sheets

(56) References Cited

U.S. PATENT DOCUMENTS

| | | | |
|---|---|---|---|
| 2015/0086875 A1 | 3/2015 | Yoshida | |
| 2015/0147660 A1 | 5/2015 | Fujiki et al. | |
| 2015/0357674 A1 | 12/2015 | Haga et al. | |
| 2016/0294004 A1* | 10/2016 | Sasaki | H01M 4/62 |
| 2019/0198916 A1* | 6/2019 | Yoon | H01M 4/366 |
| 2019/0207220 A1 | 7/2019 | Cho et al. | |
| 2020/0381773 A1* | 12/2020 | Tsujimura | H01M 4/0471 |
| 2021/0135292 A1* | 5/2021 | Holme | H01M 4/505 |

FOREIGN PATENT DOCUMENTS

| | | |
|---|---|---|
| JP | 2010-262764 A | 11/2010 |
| JP | 2015-103451 A | 6/2015 |
| JP | 2015-106550 A | 6/2015 |
| KR | 10-2018-0043152 A | 4/2018 |
| KR | 10-2018-0106978 A | 10/2018 |

OTHER PUBLICATIONS

Hama, Shigeki, JP-2010262764-A, Nov. 2010 (Year: 2010)—Espacenet Translation of JP-2010262764-A.

Lee et al., "Selection of Binder and Solvent for Solution-Processed All-Solid-State Battery", Journal of The Electrochemical Society, vol. 164, No. 9, 2017, pp. A2075-A2081.

* cited by examiner

SOLID ELECTROLYTE FILM FOR SULFIDE-BASED ALL-SOLID-STATE BATTERY BATTERIES

CROSS-REFERENCE TO RELATED APPLICATIONS

This application is a Continuation of application Ser. No. 16/409,275 filed on May 10, 2019, the entire contents of which are expressly incorporated by reference into the present application.

TECHNICAL FIELD

The present invention relates to a solid electrolyte film for sulfide-based all-solid-state batteries, and more particularly to a composite of a solid electrolyte, a binder, and a solvent used to manufacture a solid electrolyte film for sulfide-based all-solid-state batteries that is thin and has high ion conductivity.

BACKGROUND ART

A lithium-ion secondary battery or a lithium secondary battery includes a positive electrode layer, a negative electrode layer, and an electrolyte containing lithium salt interposed between the positive electrode layer and the negative electrode layer. The electrolyte may be a non-aqueous liquid or solid electrolyte. In the case in which a liquid electrolyte is used, it is necessary to equip a battery with a device configured to minimize an increase in the temperature of the battery when a short circuit occurs in the battery or with a system configured to prevent the occurrence of a short circuit in the battery, since the liquid electrolyte is combustible. The danger posed by such a liquid electrolyte has increased due to the increased demand for high-capacity and high-density batteries and the full-scale advance of electric vehicles into markets.

An all-solid-state battery, configured such that a solid electrolyte is interposed between a positive electrode and a negative electrode, whereby the battery is completely solidified, fundamentally solves the above problem and does not need additional safety devices, whereby the all-solid-state battery is economical. For these reasons, much research has been conducted into all-solid-state batteries.

A battery having a solid electrolyte applied thereto exhibits higher stability than a conventional liquid electrolyte system. However, the capacity and output of the battery having the solid electrolyte applied thereto are lower than those of the conventional liquid electrolyte system, since the solid electrolyte has low ion conductivity. The reason that ion conductivity is low in the battery having the solid electrolyte applied thereto is that the area of contact between an electrode active material and the solid electrolyte is not larger than the area of contact between the electrode active material and the liquid electrolyte in the conventional liquid electrolyte system and that the ion conductivity of the solid electrolyte itself is low.

Various attempts have been made to increase the ion conductivity of the solid electrolyte so as to approach the ion conductivity of the liquid electrolyte through the development and improvement of materials. A sulfide-based solid electrolyte has high ion conductivity, and therefore research into all-solid-state batteries to which the sulfide-based solid electrolyte is applied has been very actively conducted.

Since the sulfide-based solid electrolyte maintains the solidity thereof in spite of the high ion conductivity thereof, the area of contact of the sulfide-based solid electrolyte at the interface between the positive electrode and the negative electrode is insufficient. In order to solve this problem, a solid electrolyte having a predetermined thickness or more is applied. This physical restriction acts as a roadblock to the improvement of the energy density of all-solid-state batteries. In the case in which the thickness of the solid electrolyte is reduced, the time during which the solid electrolyte is capable of being stably used is also reduced.

Patent Document 1 relates to an electrode for all-solid-state lithium batteries, an all-solid-state lithium battery, and a device. There are provided an electrode for all-solid-state lithium batteries configured such that a metal layer is prevented from being corroded, eluted, and alloyed and such that the resistance of a battery is reduced and an all-solid-state lithium battery including the same. In Patent Document 1, the all-solid-state lithium battery includes a positive metal layer, a positive-electrode conductive resin layer stacked on the positive metal layer, a positive-electrode active material layer stacked on the positive-electrode conductive resin layer, a negative metal layer, a negative-electrode conductive resin layer stacked on the negative metal layer, a negative-electrode active material layer stacked on the negative-electrode conductive resin layer, and a solid electrolyte layer interposed between the positive-electrode active material layer and the negative-electrode active material layer.

In Patent Document 1, in order to manufacture the solid electrolyte layer, $Li_2S$—$P_2S_5$ (mass ratio 70:30), as a solid electrolyte, an SBR resin, and toluene were mixed at a mass ratio of 49.95:0.05:50 to manufacture a solid electrolyte sheet. In Patent Document 1, however, the thickness of the solid electrolyte is not considered, and a solid electrolyte that is capable of being operated for a long time even in the state of being thin is not acknowledged at all.

Patent Document 2 relates to a solid electrolyte composition, a method of manufacturing the same, and a method of manufacturing an all-solid-state battery using the same, and in particular, it is an object thereof to provide a solid electrolyte having a passivation layer formed on the surface thereof. The passivation layer may include at least one of an inorganic layer including at least one of an oxide, a nitride, or a sulfide, an organic layer including a polydopamine derivative, or a self-assembled monolayer including organosilane. Patent Document 2 is characterized in that the solid electrolyte is protected while a wet-type process is performed by the provision of a separate passivation layer. In Patent Document 2, the solid electrolyte is manufactured so as to have a thickness of 50 μm; however, long-term stability, which is required in the present invention, is not achieved even though the passivation layer is formed.

Non-Patent Document 1 relates to an optimum combination of a solid electrolyte, a binder, and a solvent, whereby solid electrolyte particles are uniformly dispersed in a slurry and high adhesive force is provided. In Non-Patent Document 1, however, the thickness of the solid electrolyte is not considered, and a solid electrolyte that is capable of being used for a long time even in the state of being thin is not acknowledged at all.

In manufacturing the solid electrolyte through the wet-type process, as described above, technology capable of reducing the thickness of the solid electrolyte and at the same time enabling the solid electrolyte to be stably used for 1000 hours or more has not been suggested. Above all, it is important to provide a method of manufacturing a solid electrolyte capable of being stably used for a long time, which is the greatest restriction to the practical use of an all-solid-state battery; however, a definite solution thereto has not been proposed.

PRIOR ART DOCUMENT

Patent Document

Japanese Patent Application Publication No. 2009-289534 (2009 Dec. 10)
Korean Patent Application Publication No. 2018-0043152 (2018 Apr. 27)

Non-Patent Document

J. of The Electrochem. Soc., 164 (9) A2075-A2081 (2017) (2017 Jul. 18)

DISCLOSURE

Technical Problem

The present invention has been made in view of the above problems, and it is an object of the present invention to provide a solid electrolyte film for sulfide-based all-solid-state batteries that is flexible, thin, characterized by high electrical conductivity, and usable for a long time and a wet-type manufacturing method thereof.

Technical Solution

In accordance with a first aspect of the present invention, the above and other objects can be accomplished by the provision of a solid electrolyte film composition for sulfide-based all-solid-state batteries, the solid electrolyte film composition including a sulfide-based solid electrolyte, a polymer binder including C and H therein but not including O, N, and F therein, and a solvent having a dielectric constant of x (1.0<x<3.1).

The solvent may be at least one of benzene, $CCl_4$, hexane, cyclohexane, heptane, or xylene.

In accordance with a second aspect of the present invention, there are provided a solid electrolyte film for sulfide-based all-solid-state batteries manufactured using the solid electrolyte film composition for sulfide-based all-solid-state batteries and a sulfide-based all-solid-state battery comprising the solid electrolyte film.

The thickness of the solid electrolyte film for sulfide-based all-solid-state batteries may be 60 μm or less, and the operating time of the solid electrolyte film based on the evaluation of Li plating and stripping may be 1000 hours or more.

In addition, the ion conductivity of the solid electrolyte film for sulfide-based all-solid-state batteries may be $10^{-4}$ S/cm or more.

Effects of the Invention

The present invention relates to a solid electrolyte film for sulfide-based all-solid-state batteries, and more particularly to a composite of a solid electrolyte, a binder, and a solvent used to manufacture a solid electrolyte film for sulfide-based all-solid-state batteries that is thin and has high ion conductivity.

According to the present invention, it is possible to provide a solid electrolyte film for sulfide-based all-solid-state batteries that is flexible, thin, characterized by high electrical conductivity, and usable for a long time and a wet-type manufacturing method thereof.

In particular, the present invention provides a solid electrolyte film composition for sulfide-based all-solid-state batteries, wherein the solid electrolyte film composition includes a solvent having a dielectric constant of x (1.5<x<3.0), the thickness of a solid electrolyte film for sulfide-based all-solid-state batteries manufactured using the same is 60 μm or less, and the solid electrolyte film is capable of being stably used for at least 1000 hours or more, and up to 2000 hours, based on the evaluation of Li plating and stripping.

DETAILED DESCRIPTION OF THE INVENTION

The present invention relates to a solid electrolyte film for sulfide-based all-solid-state batteries, and more particularly to a composite of a solid electrolyte, a binder, and a solvent used to manufacture a solid electrolyte film for sulfide-based all-solid-state batteries that is thin and has high ion conductivity.

In the case in which a solid electrolyte layer is manufactured so as to be thin, it is possible to greatly increase the energy density of a sulfide-based all-solid-state battery. To this end, first of all, it is necessary to maintain the ion conductivity of a solid electrolyte in a high state, and it is preferable to form the solid electrolyte layer so as to have the shape of a flexible thin film.

To this end, a wet-type manufacturing method of an electrode including a binder having no electro-negative functional group, a non-polar solvent, and a sulfide-based solid electrolyte is provided.

Specifically, the sulfide-based solid electrolyte may be at least one of $Li_6PS_5$ (hereinafter, referred to as "LPS"), $Li_6PS_5Cl$ (hereinafter, referred to as "LPSCl"), $Li_3PS_4$, $Li_{10}GeP_2S_{12}$, Thio-LISICON ($Li_{3.25}Ge_{0.25}P_{0.75}S_4$), $Li_2S$—$P_2S_5$—LiCl, $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_7P_3S_{11}$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, $Li_{9.54}Si_{1.74}P_{1.44}S_{11.7}Cl_{0.3}$, or $Li_7P_3S_{11}$.

Any sulfide-based materials available on the market may be used, or a material manufactured by crystallizing an amorphous sulfide-based material may also be used.

The average particle diameter of sulfide-based solid electrolyte particles is used within a range suitable for all-solidstate batteries. For example, the average particle diameter of the sulfide-based solid electrolyte particles may be 0.1 μm to 50 μm, preferably 0.5 μm to 20 μm. If the average particle diameter of the sulfide-based solid electrolyte particles is less than the above range, the particles may aggregate with each other. If the average particle diameter of the sulfide-based solid electrolyte particles is greater than the above range, on the other hand, the porosity of the manufactured solid electrolyte is high, whereby the capacity of the battery may be reduced, and therefore the characteristics of the battery may be deteriorated.

Preferably, each of the sulfide-based particles has an ion conductivity of $1\times10^{-4}$ S/cm or more. More preferably, each of the sulfide-based particles has an ion conductivity of $1\times10^{-3}$ S/cm or more.

In addition to the above-mentioned sulfide-based solid electrolytes, other well-known solid electrolytes may also be used. In an example, an inorganic solid electrolyte, such as $Li_2O$—$B_2O_3$, $Li_2O$—$B_2O_3$—$P_2O_5$, $Li_2O$—$V_2O_5$—$SiO_2$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1), or $Li_{3.6}Si_{0.6}P_{0.4}O_4$, may be used.

Specifically, a polymer binder including C and H therein but not including O, N, and F therein is preferably used as the binder having no electro-negative functional group. A preferred example of the polymer binder may be at least one of styrene-ethylene-butylene-styrene (SEBS), styrene-butadiene-styrene (SBS), or styrene-butadiene rubber (SBR).

In addition, a solvent having a dielectric constant of x (1.5<x<3.0) is used in the wet-type electrode manufacturing method according to the present invention. A concrete example of the solvent may be at least one of benzene, $CCl_4$, hexane, cyclohexane, heptane, or xylene.

In a preferred combination of the present invention, the sulfide-based solid electrolyte is at least one of LPS, $Li_6PS_5Cl$ (LPSCl), or $Li_7P_3S_{11}$, the polymer binder is SEBS, and the solvent is at least one of hexane, heptane, or xylene.

In addition, the present invention provides a solid electrolyte film for sulfide-based all-solid-state batteries manufactured using the solid electrolyte film composition for sulfide-based all-solid-state batteries and a sulfide-based all-solid-state battery including the solid electrolyte film for sulfide-based all-solid-state batteries.

The thickness of the solid electrolyte film for sulfide-based all-solid-state batteries according to the present invention is 60 μm or less, preferably 50 μm or less, and the operating time of the solid electrolyte film based on the evaluation of Li plating and stripping is 1000 hours or more, preferably 2000 hours or more.

Manufacture of all-Solid-State Battery

Specifically, an all-solid-state battery according to the present invention includes a positive electrode, a negative electrode, and the above-described sulfide-based solid electrolyte interposed between the positive electrode and the negative electrode.

An electrode of the all-solid-state battery has a structure in which an electrode active material is formed on an electrode current collector. The electrode current collector may be omitted depending on the structure of the electrode. In the case in which the electrode is a positive electrode, the electrode current collector is a positive electrode current collector. In the case in which the electrode is a negative electrode, the electrode current collector is a negative electrode current collector.

The all-solid-state battery is manufactured through a dry compression process, in which electrode powder and solid electrolyte powder are manufactured, introduced into a predetermined mold, and pressed, or a slurry coating process, in which a slurry composition including an active material, a solvent, and a binder is manufactured, coated, and dried. In the present invention, the method of manufacturing the all-solid-state battery having the above-described structure is not particularly restricted. Any well-known method may be used.

In an example, the solid electrolyte is disposed between the positive electrode and the negative electrode, and then the same is compressed in order to assemble a cell. The assembled cell is mounted in a sheathing member, and then the sheathing member is encapsulated by heating and compression. A laminated case made of aluminum or stainless steel, a cylindrical metal container, or a prismatic metal container may be appropriately used as the sheathing member.

The electrode slurry may be coated on the current collector using a method of placing the electrode slurry on the current collector and uniformly dispersing the electrode slurry with a doctor blade, a die casting method, a comma coating method, or a screen printing method. Alternatively, the electrode slurry and the current collector may be formed on a separate substrate, and the electrode slurry and the current collector may be joined to each other through pressing or lamination. At this time, the concentration of a slurry solution or the number of coatings may be adjusted in order to adjust the final coating thickness.

The drying process is a process of removing the solvent or moisture from the slurry in order to dry the slurry coated on the metal current collector. The drying process may vary depending on the solvent that is used. In an example, the drying process may be performed in a vacuum oven having a temperature of 50° C. to 200° C. For example, drying may be performed using a warm-air drying method, a hot-air drying method, a low-humidity-air drying method, a vacuum drying method, a (far-)infrared drying method, or an electron-beam radiation method. The drying time is not particularly restricted. In general, drying is performed within a range of 30 seconds to 24 hours.

After the drying process, a cooling process may be further performed. In the cooling process, slow cooling to normal temperature may be performed such that the recrystallized structure of the binder is sufficiently formed.

In addition, if necessary, a rolling process, in which the electrode is passed through a gap between two heated rolls such that the electrode is compressed so as to have a desired thickness, may be performed in order to increase the capacity density of the electrode and to improve adhesion between the current collector and the active material after the drying process. In the present invention, the rolling process is not particularly restricted. A well-known rolling process, such as pressing, may be performed. In an example, the electrode may pass through a gap between rotating rolls, or a flat press machine may be used to press the electrode.

Positive Electrode

A positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver.

A positive electrode active material includes an excellent positive electrode active material particle for sulfide-based all-solid-state batteries, the surface of which is reformed, according to the present invention. In addition, an additional material may be added depending on what a lithium secondary battery is used for. For example, a transition-metal-compound-based active material or a sulfide-based active material may be used.

A concrete example of the positive electrode active material particle, before the surface thereof is treated, includes a material for the active material selected from the group consisting of one or more of a layered compound, such as a lithium manganese composite oxide ($LiMn_2O_4$ or $LiMnO_2$), a lithium cobalt oxide ($LiCoO_2$), or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; and $Fe_2(MoO_4)_3$, and a derivative thereof.

For example, an oxide, sulfide, or halide of scandium, ruthenium, titanium, vanadium, molybdenum, chrome, manganese, iron, cobalt, nickel, copper, or zinc may be used as the transition metal compound. More specifically, $TiS_2$, $ZrS_2$, $RuO_2$, $Co_3O_4$, $Mo_6S_8$, or $V_2O_5$ may be used. However, the present invention is not limited thereto.

A sulfur element, a disulfide compound, an organosulfur compound, or a carbon-sulfur polymer $((C_2S_x)_n$, where x=2.5 to 50, n≥2) may be used as the sulfide-based active material. Other well-known materials may also be included.

Negative Electrode

A negative electrode current collector is not particularly restricted, as long as the negative electrode current collector exhibits high conductivity while the negative electrode current collector does not induce any chemical change in an all-solid-state battery. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may be configured in any of various forms, such as that of a film, a sheet, a foil, a net, a porous body, a foam body, or a non-woven fabric body, on the surface of which a microscale uneven pattern is formed, in the same manner as in the positive electrode current collector.

A negative electrode active material may be one selected from the group consisting of a lithium metal, a lithium alloy, a lithium-metal composite oxide, a titanium composite oxide containing lithium (LTO), and a combination thereof. An alloy of lithium and at least one metal selected from among Na, K, Rb, Cs, Fr, Be, Mg, Ca, Sr, Ba, Ra, Al, and Sn may be used as the lithium alloy. In addition, the lithium-metal composite oxide may include lithium and an oxide ($MeO_x$) of a metal (Me) selected from the group consisting of Si, Sn, Zn, Mg, Cd, Ce, Ni, and Fe. In an example, the lithium-metal composite oxide may be $Li_xFe_2O_3$ (0<x≤1) or $Li_xWO_2$ (0<x≤1).

In addition, a metal composite oxide, such as $Sn_xMe_{1-x}Me'_yO_z$ (Me: Mn, Fe, Pb, Ge; Me': Al, B, P, Si, Group 1, 2 and 3 elements of the periodic table, halogen; 0<x≤1; 1≤y≤3; 1≤z≤8), or an oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$, may be used as the negative electrode active material. Furthermore, a carbon-based negative electrode active material, such as crystalline carbon, amorphous carbon, or a carbon composite, may be used, either alone or in a combination of two or more materials.

Conductive Agent and Dispersant

As needed, a conductive agent, a solid electrolyte, or a dispersant may be further added, in addition to the active material.

Nickel powder, a cobalt oxide, a titanium oxide, or carbon may be used as the conductive agent. At least one selected from the group consisting of Ketjen black, acetylene black, furnace black, graphite, carbon fiber, and fullerene may be used as the carbon.

Hereinafter, the present invention will be described with reference to preferred manufacturing examples and examples. However, the following manufacturing examples and examples are provided only for illustration of the present invention and should not be construed as limiting the scope of the present invention.

Experimental Example 1: Effect of Dispersion of Binder

Binders and solvents were mixed to prepare Examples according to the present invention and Comparative Examples, and the effect of dispersion of the binders was observed. Acetonitrile (ACN), dimethyl carbonate (DMC), toluene (TOL), and xylene (XYL) were used as the solvents. The following compounds were used as the binders.

Figure 1:
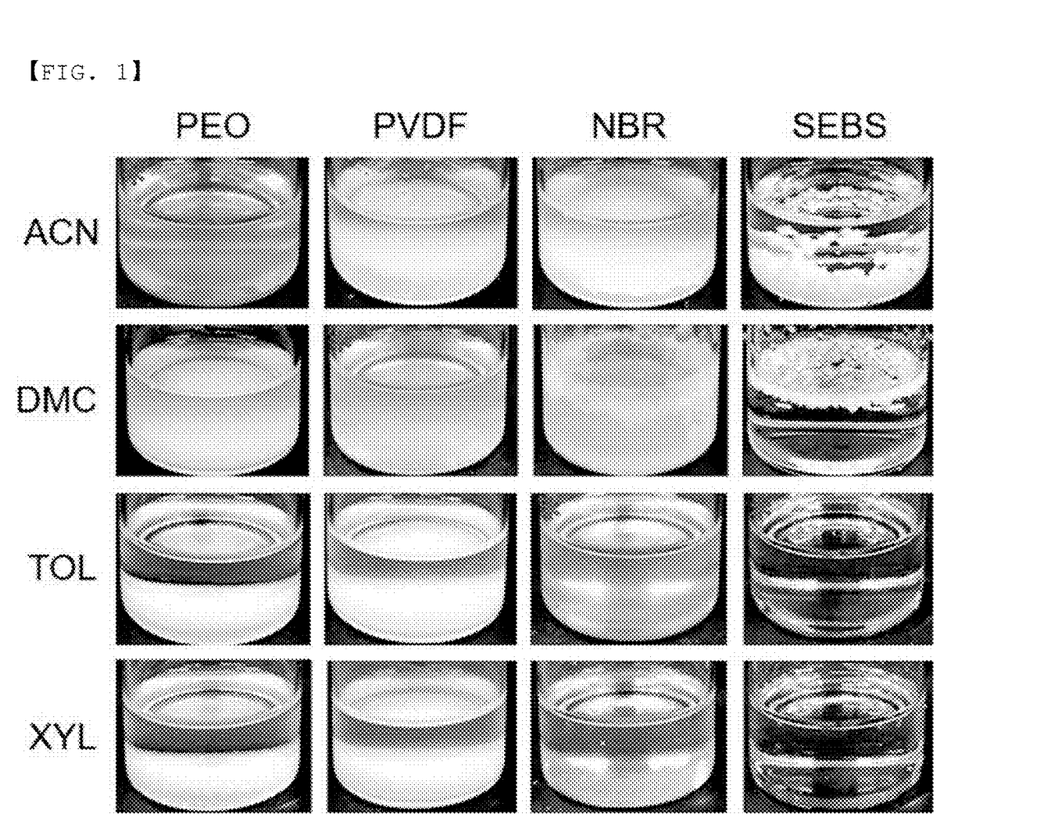
FIG. 1 is a view showing the results of observation of the effect of dispersion of a binder and a solvent.

The result of dispersion of 1 g of each binder in 3 ml of each solvent when the binder and the solvent were mixed with each other is shown in FIG. 1. SEBS, which included only C and H, exhibited the most dispersibility.

TABLE 1

|     | PEO | PVDF - HFP | MBR | SEBS |
| --- | --- | --- | --- | --- |
| ACN | Comparative Example 1-1 | Comparative Example 1-2 | Comparative Example 1-3 | Comparative Example 1-4 |
| DMC | Comparative Example 1-5 | Comparative Example 1-6 | Comparative Example 1-7 | Comparative Example 1-8 |
| TOL | Comparative Example 1-9 | Comparative Example 1-10 | Example 1-1 | Example 1-2 |
| XYL | Comparative Example 1-11 | Comparative Example 1-12 | Example 1-3 | Example 1-4 |

Experimental Example 2: Compatibility of Solid Electrolyte and Solvent (XRD Measurement)

In order to measure the compatibility of a solid electrolyte and a solvent, LPS ($Li_6PS_5$), as a sulfide-based solid electrolyte, was dispersed in solvents ACN, DMC, TOL, and XYL according to Examples and Comparative Examples, and a change in the structure of the solid electrolyte was measured using XRD. "Pristine" indicates the powdered state immediately after the composition of the solid electrolyte.

Example 2-1: TOL+LPS

Example 2-2: XYL+LPS

Comparative Example 2-1: ACN+LPS

Comparative Example 2-2: DMC+LPS

Comparative Example 2-3: Pristine+LPS

At the time of measurement using XRD, the total amount of the solid electrolyte LPS was 10 mg. LPS and 3 ml of a solvent were mixed for 1 hour, and vacuum drying was performed for 12 hours. After the solvent was evaporated, powder was collected and measured using XRD. XRD measurement was performed from 5 degrees to 80 degrees, and the step size was 0.2. The measurement source was a Cu target.

Figure 2:
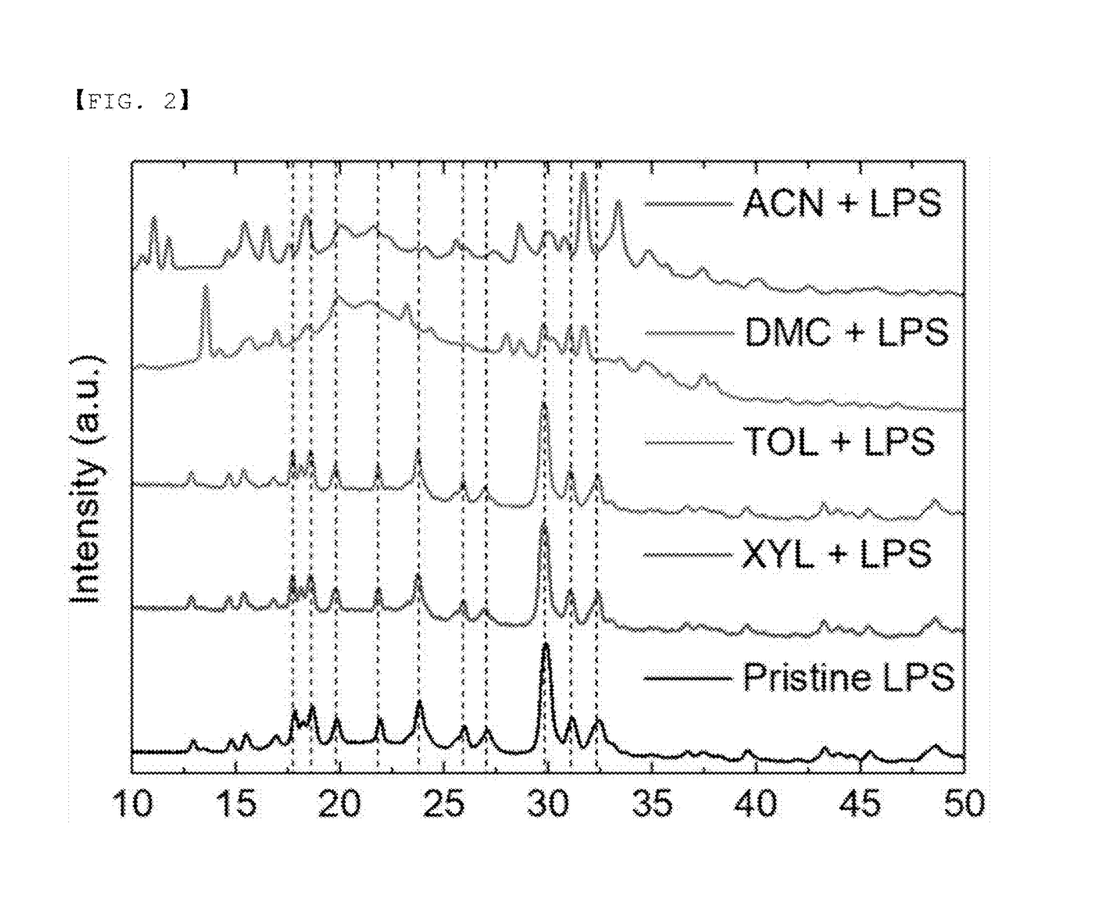
FIG. 2 is a view showing the results of XRD measurement for measuring the compatibility of a solid electrolyte and a solvent.

The results are shown in FIG. 2. It can be seen from FIG. 2 that the structure of the solid electrolyte in a solvent having a low dielectric constant was only slightly changed. In FIG. 2, the solvents were ACN, DMC, TOL, XYL, and pristine from top to bottom. That is, it can be seen that Example 2-1 and Example 2-2 according to the present invention were similar to pristine as to the shapes of the graphs compared to Comparative Example 2-1 and Comparative Example 2-2, indicating that the change in the structure of the solid electrolyte was slight.

Experimental Example 3: Compatibility of Solid Electrolyte and Solvent (Ion Conductivity Measurement)

In order to observe a change in the ion conductivity of LPS depending on a solvent, LPS was dispersed in solvents ACN, DMC, TOL, and XYL according to Examples and Comparative Examples, and the ion conductivity of LPS in a pristine state was also measured. At this time, SEBS was used as a binder.

Example 3-1: TOL+LPS+SEBS

Example 3-2: XYL+LPS+SEBS

Comparative Example 3-1: ACN+LPS+SEBS

Comparative Example 3-2: DMC+LPS+SEBS

Comparative Example 3-3: Pristine+LPS+SEBS

In order to measure impedance, a solid electrolyte sample having a predetermined area A and a thickness t, like a cylindrical shape, was prepared. The diameter of the sample was 1 cm, and the thickness of the sample was 0.055 mm. A film including about 7 mg of LPS was introduced, and then measurement was performed.

Platinum or copper electrodes having high electric conductivity, as ion blocking electrodes, were formed on opposite surfaces of a flat sample through dry deposition.

Alternating-current voltage was applied through the electrodes on the opposite surfaces of the sample. At this time, as application conditions, the amplitude of the voltage was set to 30 mV, which was an amplitude used to measure the impedance of a secondary battery using a general liquid electrolyte, and the measurement frequency range was set to a range of 0.1 Hz to 1 MHz.

The resistance $R_b$ of the bulk electrolyte was calculated from an intersection point at which a semicircle of the measured impedance track joins an actual axis, and the ion conductivity σ of LPS was calculated from the area A and the thickness t (or l) of the sample, as expressed by the following equation.

$$\sigma(\Omega \cdot cm)^{-1} = \frac{1}{R_b} \frac{l}{A}$$

Figure 3:
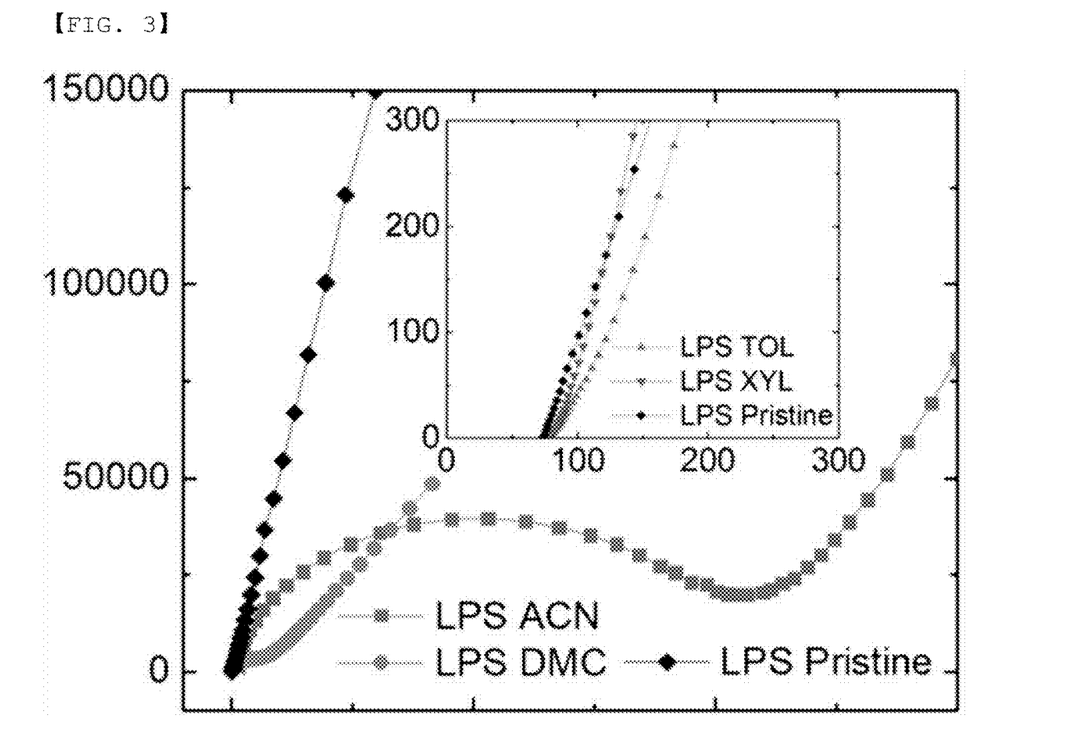
FIG. 3 is a view showing the results of impedance measurement for measuring the compatibility of a solid electrolyte and a solvent.

The impedance measurement results related thereto are shown in FIG. 3. FIG. 3 shows the impedance measurement values, wherein the X axis indicates the resistance value and the Y axis indicates a reactance value. The ion conductivity values $(\Omega cm)^{-1}$ of LPS depending on the solvent based on the measurement results are as follows. The value right next to each solvent indicates the dielectric constant of the solvent.

Comparative Example 3-3 Pristine: $1.20 \times 10^{-3}$ $(\Omega cm)^{-1}$

Example 3-2 XYL(2.3): $1.19 \times 10^{-3}$ $(\Omega cm)^{-1}$

Example 3-1 TOL(2.4): $1.12 \times 10^{-3}$ $(\Omega cm)^{-1}$

Comparative Example 3-2 DMC(3.1): $1.11 \times 10^{-5}$ $(\Omega cm)^{-1}$

Comparative Example 3-1 ACN(35.7): $7.4 \times 10^{-7}$ $(\Omega cm)^{-1}$

It can be seen that, in the case of Comparative Example 3-2, the ion conductivity value was $1.11 \times 10^{-5}$ $(\Omega cm)^{-1}$ when the dielectric constant was 3.1, and in the case of Example 3-1, i.e. toluene (dielectric constant 2.4), the ion conductivity value was $1.12 \times 10^{-3}$ $(\Omega cm)^{-1}$. Since the value of the ion conductivity is changed in the unit thereof as the value of the dielectric constant is reduced, it can be estimated that the value of the ion conductivity is changed approximately according to a logarithmic scale. Consequently, it can be seen from the comparison results that the dielectric constant of the solvent suitable to achieve the object of the present invention must be less than 3.1, preferably 3.0 or less, and more preferably less than 3.0. Meanwhile, since the value of the ion conductivity increases as the value of the dielectric constant decreases, a solvent having a small dielectric constant is advantageous; however, the dielectric constant must be greater than 1, since the dielectric constant is a value relative to the permittivity of a vacuum. Preferably, therefore, the dielectric constant of the solvent suitable to achieve the object of the present invention ranges from more than 1 to less than 3.1. It can be seen from the comparison experiment that the binder suitable to achieve the object of the present invention is a polymer including only C and H.

Experimental Example 4: Compatibility of Solid Electrolyte and Solvent Depending on Temperature Meanwhile, the dielectric constant is changed depending on the temperature. In order to evaluate the effects related thereto, therefore, the ion conductivity was measured using a method identical to the method used in Experimental Example 3 but while changing the temperature. Xylene, heptane, and hexane were used as ion solvents, and SEBS was used as a binder. As can be seen from the following table, the ion conductivity was higher as the dielectric constant was lower.

TABLE 2

| | SSE | Solvent | Polymer | σ @ RT/S cm$^{-1}$ | Dielectric constant |
|---|---|---|---|---|---|
| Example 3-2 | $Li_7P_3S_{11}$ | Xylene | SEBS | $0.6 \times 10^{-3}$ | 2.2 |
| Example 3-3 | $Li_6PS_5Cl$ | Heptane | SEBS | $0.8 \times 10^{-3}$ | 1.9 |
| Example 3-4 | $Li_6PS_5Cl$ | Hexane | SEBS | $1.2 \times 10^{-3}$ | 1.89 |

Figure 4:
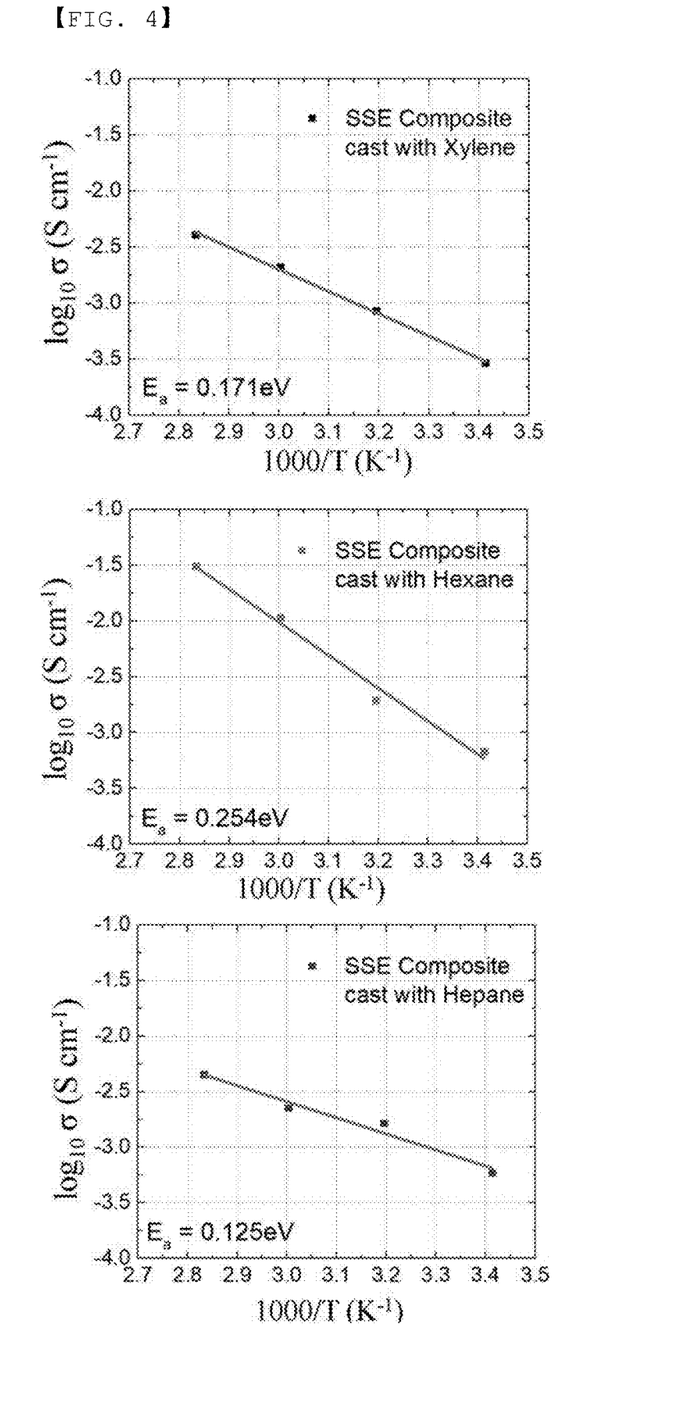
FIG. 4 is a view showing the results of measurement of ion conductivity based on temperature for observing the compatibility of a solid electrolyte and a solvent.

FIG. 4 shows changes in ion conductivity depending on the time and solvent. It can be seen that the ion conductivity value at normal temperature was the lowest and that the ion conductivity increased as the temperature increased. This phenomenon was particularly prominent for hexane, the dielectric constant of which was low. Consequently, it can be seen that, since the temperature of a battery becomes higher than normal temperature as the battery is operated, it is more advantageous to use a solvent having a low dielectric constant.

Experimental Example 5: Evaluation of Stability of Solid Electrolyte Layer

In order to evaluate the stability of the solid electrolyte layer according to the present invention, Li plating and stripping evaluation was performed on Example 3-2.

Figure 5:
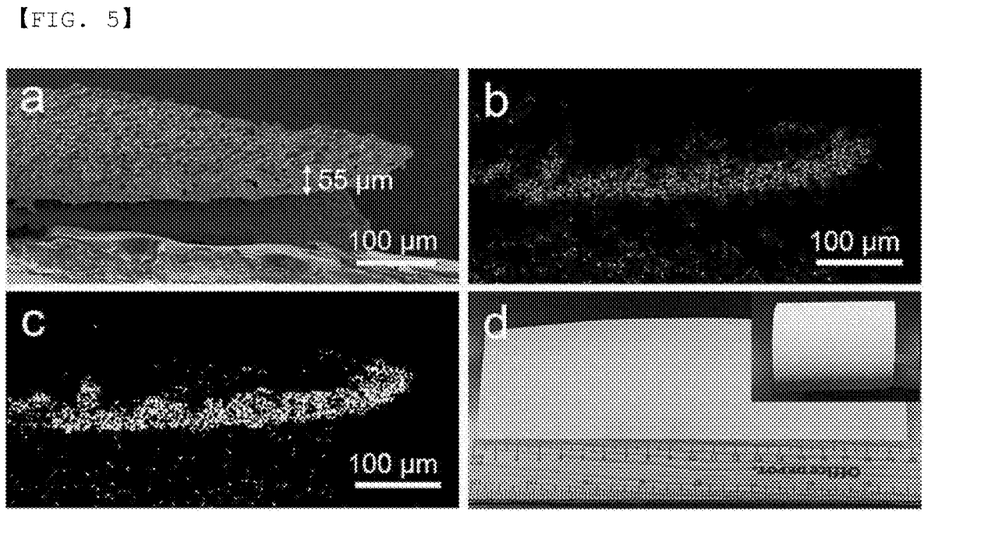
FIG. 5 is an electron microscope photograph showing the section of an all-solid-state battery according to the present invention.
Figure 6:
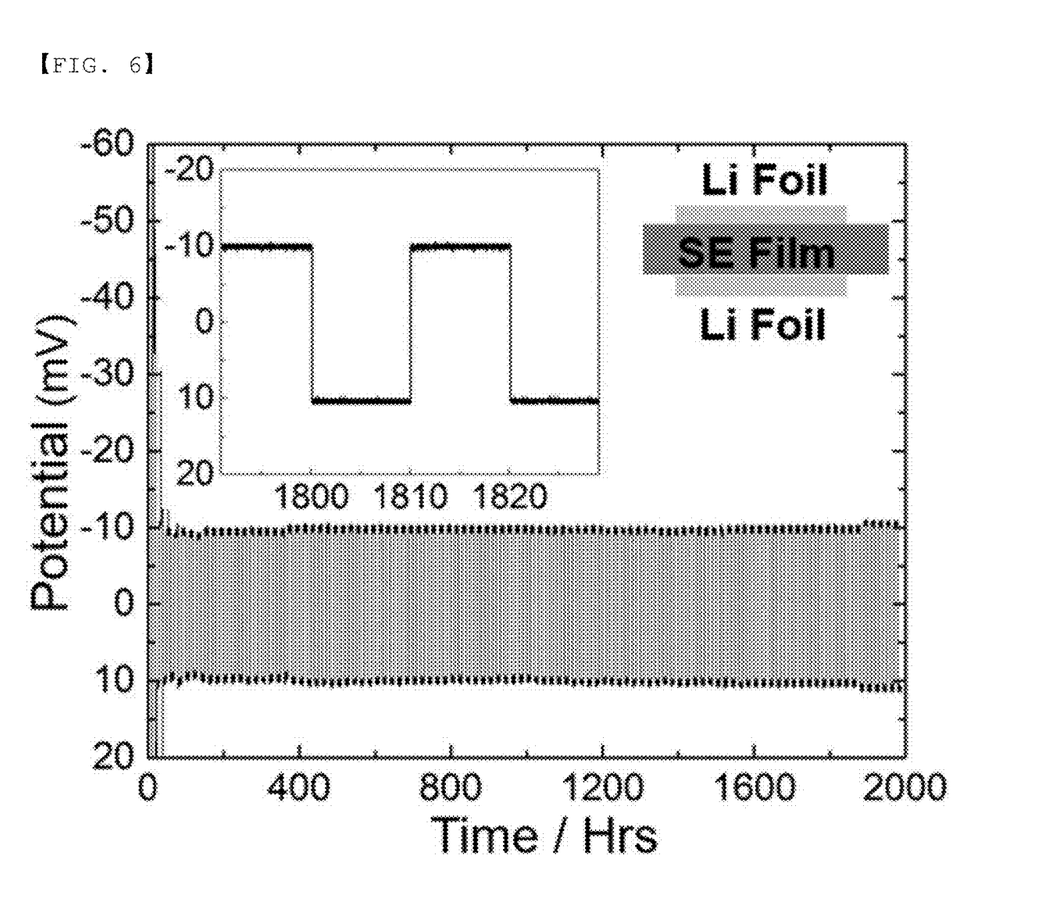
FIG. 6 is a view showing the result of evaluation of the lifespan of the all-solid-state battery according to the present invention.

Electrochemical evaluation was performed under conditions of 0.11 mA/cm$^2$ 10 h charging, 10 h discharging, and 200 μm. About 40 mg of a solid electrolyte film was used. In addition, an Li metal was disposed on opposite surfaces of the solid electrolyte layer. The film was manufactured so as to have a diameter of 1.3 cm. FIG. 5 is an SEM photograph related thereto, and FIG. 6 shows the result of evaluation of (potential) stability based on long-term operation.

FIG. 5(a) is a general SEM photograph, which shows the thickness of the solid electrolyte film.

FIG. 5(b) is a P EDX image, which shows the solid electrolyte film.

FIG. 5(c) is an S EDX image, which shows the solid electrolyte film.

FIG. 5(d) is an actual photograph showing the flexible state of the solid electrolyte film.

It can be seen from FIG. 6 that the all-solid-state battery according to the present invention is stable for 2000 hours or more.

As is apparent from the above description, the solid electrolyte according to the present invention has excellent lifespan characteristics that ensure stability for a long time while maintaining high ion conductivity even in the state in which the solid electrolyte is thin.

The invention claimed is:

1. A method for preparing a sulfide-based all-solid-state battery comprising:
    (a) preparing a sulfide-based solid electrolyte film by:
        (1) providing a mixture comprising (i) a sulfide-based solid electrolyte material; (ii) a polymer binder comprising C and H therein but not comprising any of O, N, and F therein; and (iii) a solvent having a dielectric constant of x, wherein 1.0<x<3.1; and
        (2) processing the mixture using a wet-type manufacturing process to produce the sulfide-based solid electrolyte film, wherein the sulfide-based solid electrolyte film is flexible; and
    (b) interposing the sulfide-based solid electrolyte film between a positive electrode and a negative electrode, wherein the polymer binder is SEBS,
    wherein the sulfide-based solid electrolyte material comprises $Li_6PS_5$,
    wherein the sulfide-based solid electrolyte material has an average particle diameter of 0.1 μm to 50 μm, and
    wherein the sulfide-based solid electrolyte film has a thickness of 60 m or less.

2. The method according to claim 1, wherein the sulfide-based solid electrolyte material has an average particle diameter of 0.5 μm to 20 μm.

3. The method according to claim 1, wherein the solvent is at least one of benzene, $CCl_4$, hexane, cyclohexane, heptane, or xylene.

4. The method according to claim 1, wherein the solvent is at least one of hexane, heptane, or xylene.

5. The method according to claim 1, wherein the solvent is at least hexane.

6. The method according to claim 1, wherein the solvent is at least heptane.

7. The method according to claim 1, wherein the mixture further comprises an inorganic solid electrolyte.

8. The method according to claim 7, wherein the inorganic solid electrolyte is selected from the group consisting of $Li_2O$—$B_2O_3$, $Li_2O$—$B_2O_3$—$P_2O_5$, $Li_2O$—$V_2O_5$—$SiO_2$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1), and $Li_{3.6}Si_{0.6}P_{0.4}O_4$.

9. The method according to claim 1, wherein the sulfide-based solid electrolyte film has a thickness of 50 m or less.

10. The method according to claim 1, wherein an ion conductivity of the sulfide-based solid electrolyte film is 10-4 S/cm or more.

11. The method according to claim 1, wherein an operating time of the sulfide-based solid electrolyte film based on an evaluation of Li plating and stripping is 1000 hours or more.

12. The method according to claim 1, wherein the method excludes acetonitrile, and dimethyl carbonate.

13. A method for preparing a sulfide-based solid electrolyte film for a sulfide-based all-solid-state battery consisting of:
(a) preparing a sulfide-based solid electrolyte film by:
(1) providing a mixture consisting of (i) a sulfide-based solid electrolyte material; (ii) a polymer binder comprising C and H therein but not comprising any of O, N, and F therein; and (iii) a solvent having a dielectric constant of x, wherein 1.0<x<3.1; and
(2) processing the mixture using a wet-type manufacturing process to produce the sulfide-based solid electrolyte film,
wherein the polymer binder is SEBS,
wherein the sulfide-based solid electrolyte material comprises $Li_6PS_5$,
wherein the sulfide-based solid electrolyte film is flexible;
wherein the sulfide-based solid electrolyte material has an average particle diameter of 0.1 μm to 50 μm, and
wherein the sulfide-based solid electrolyte film has a thickness of 60 m or less.

* * * * *